United States Patent [19]

Stueble

[11] Patent Number: 5,709,721
[45] Date of Patent: Jan. 20, 1998

[54] AIR HANDLING APPARATUS FOR TEXTILE MACHINES

[75] Inventor: Helmut Stueble, Spartanburg, S.C.

[73] Assignee: LTG Technologies, Inc., Spartanburg, S.C.

[21] Appl. No.: 595,001

[22] Filed: Jan. 31, 1996

[51] Int. Cl.[6] .................... B01D 39/00; B01D 39/02
[52] U.S. Cl. .................... 55/212; 55/312; 55/344; 55/350.1
[58] Field of Search .................... 55/283, 284, 271, 55/272, 273, 212, 312, 344, 350.1

[56] References Cited

U.S. PATENT DOCUMENTS

| 385,899 | 7/1888 | Allfree. |
|---|---|---|
| 1,842,316 | 1/1932 | Coulter. |
| 3,412,545 | 11/1968 | Lippuner. |
| 3,762,143 | 10/1973 | Stewart. |
| 3,926,665 | 12/1975 | Harrap et al.. |
| 3,951,623 | 4/1976 | Furstenberg. |
| 4,217,116 | 8/1980 | Seever. |
| 4,222,754 | 9/1980 | Horvat .................... 55/283 |
| 4,494,375 | 1/1985 | Rao et al.. |
| 4,502,874 | 3/1985 | Levie et al.. |
| 4,681,604 | 7/1987 | Niederer. |
| 4,778,491 | 10/1988 | Yow, Sr.. |
| 4,857,090 | 8/1989 | Hartness. |
| 4,895,581 | 1/1990 | Starling. |
| 5,174,797 | 12/1992 | Yow, Sr. et al.. |
| 5,279,629 | 1/1994 | Stueble .................... 55/343 |

FOREIGN PATENT DOCUMENTS 982604  2/1965  United Kingdom.

Primary Examiner—Jay H. Woo
Assistant Examiner—Robert Hopkins
Attorney, Agent, or Firm—Dority & Manning, P.A.

[57] ABSTRACT

An air handling apparatus and method for use with textile machines for filtering waste fiber material without adversely interrupting operation of the textile machine is provided. A common vacuum system is configured for drawing first, second and third independent air streams from the textile machine. Each of the independent air streams conveys a type of waste fiber material from the textile machine. A filtering system in pneumatic communication with the common vacuum system includes filtering devices for combining and commonly filtering the air streams. The filtering system includes a first filter device configured to selectively filter the waste fiber material types from, and to combine, the first, second and third air streams so that a desired at least one waste fiber material may be conveyed by the combined air stream. The filtering system also includes a second filter device configured to separate waste fiber material from the combined air stream.

26 Claims, 4 Drawing Sheets

AIR HANDLING APPARATUS FOR TEXTILE MACHINES

BACKGROUND OF THE INVENTION

The present invention relates to an air handling and filtering system, and more particularly to an air cleaning system for use with textile spinning machines.

As discussed in my U.S. Pat. No. 5,279,629, with modern textile machines, particularly air spinning machines and open-end spinning machines, a significant amount of dust, fly, and fiber material in general is generated during the yarn spinning process. The fly and fiber material consists essentially of two types: waste fiber material that is generally of little value (trash waste), and reusable fiber material (reusable waste) which is far more valuable and useful. Various attempts have been made in the art to filter the trash waste and reusable waste without adversely impacting upon the operation of the textile machines. One such solution is disclosed in the '629 patent.

Generally, the filtering devices and methods known in the art for separately filtering the reusable waste and trash waste material require that the exhaust fan be shut off during the cleaning operation while the waste matte is pulled from the filtering devices. This is a time consuming operation which significantly adversely impacts upon the production capacity of the textile machines.

In the '629 patent, I provided a method and apparatus wherein the reusable waste is drawn and filtered by a common suction and filtering source, with the trash waste being independently filtered at the textile machines. This system provides a means for cleaning the trash waste filters without the necessity of shutting down the exhaust fan drawing the air streams. Additionally, drawing of the air streams with a common suction source is energy efficient. In this manner, the air streams were efficiently filtered, and textile machine production was not affected.

However, the method and apparatus of the '629 patent still required that an operator enter the end housing unit of the filtering system, which is traditionally attached to the end unit of a textile machine, in order to clean the filtering device which filtered the trash waste material. During the time required for the operator to clean this filter, the air streams are combined so that the trash waste is mixed with the reusable waste, which is a generally undesirable condition. Additionally, the air handling and filtering systems are configured with a plurality of textile machines. Thus, in the invention of the '629 patent, in order to minimize the time when the two air streams are combined for cleaning of the second filter, it would be necessary for a number of individual operators to simultaneously clean the second filters from each of the housing units so that the mixing time of the two air streams is minimized. This requires a significant amount of coordination and manpower. Additionally, the invention of the '629 patent does not provide for common filtering of the trash waste.

Furthermore, recently developed spinning machines now output more than two waste fiber material types. For example, the Murata spinning machine 802 outputs generally useful white waste and thread waste as well as generally trash knotter combined waste. Present systems configured to separate and filter only the useful waste from the trash waste are, generally, unable to distinguish and separate different types of useful waste.

The present invention significantly improves upon the method and apparatus disclosed in U.S. Pat. No. 5,279,629, and provides a more efficient method and device for separately filtering and cleaning independent air streams from a plurality of textile machines.

OBJECTS AND SUMMARY OF THE INVENTION

It is therefore a principal object of the present invention to provide an improved air filtering system and method for textile machines which is not detrimental to yarn quality or formation during cleaning of the filters.

Another principal object of the present invention is to provide a more versatile air handling and filtering system and method which maintains a relatively constant negative pressure at the spinning stations during all phases of operation, and which requires little or no man power to operate.

Additional objects and advantages of the invention will be set forth in part in the description which follows, and in part will be obvious from the description or may be learned by practice of the invention. The objects and advantages may be realized and attained by means of the instrumentalities and combinations particularly pointed out in the appended claims.

To achieve the objects, and in accordance with the purposes of the invention as embodied and broadly described herein, an air handling apparatus for use with textile machines for filtering waste fiber without adversely interrupting operation of the textile machine is provided. The apparatus includes a common vacuum system. The common vacuum system is configured for drawing first, second, and third independent air streams from the textile machine, each of the independent air streams conveying a type of waste fiber material from the textile machine. A filtering system is in pneumatic communication with the common vacuum system. The filtering system includes filtering devices combining and commonly filtering the first, second, and third air streams.

The filtering system includes a first filter device configured to selectively filter the waste fiber material types from, and to combine, the first, second, and third air streams so that a desired at least one waste fiber material may be conveyed by the combined air stream. A second filter device is configured to separate waste fiber material from the combined air stream.

In one preferred embodiment, the first filter is configured for at least three operational modes, each operational mode causing a corresponding waste fiber material combination to be conveyed by the combined air stream. In this embodiment, the combined air stream will convey white waste, thread waste, and a combination of white and knotter combined waste in the first, second, and third operational modes, respectively.

In this embodiment, the first filter device is an individual filter device disposed in a housing structure generally adjacent the end of each textile machine. Each first filter device is in pneumatic communication with the common vacuum system, which draws the three air streams from its associated textile machine. The first filter defines first, second and third waste chambers which receive the first, second and third air streams, respectively. Each waste chamber communicates with the combined air stream path via a damper such that if the damper to a particular waste chamber is left open while the common vacuum system is operating, the air stream received by that waste chamber is drawn directly and unfiltered to the combined air stream path. An open damper, therefore, causes the waste fiber material that is received by the particular waste chamber to enter and be carried by the combined air stream.

Accordingly, if all the dampers are open, all three waste fiber types will be carried by their respective air streams directly through the dampers to the combined air stream. By independently controlling the dampers, however, the apparatus may selectively permit air flow directly from each waste chamber to the combined air stream path, thus permitting only desired waste fiber materials to be conveyed by the combined air stream.

In the first operational mode, the first waste chamber damper is open, while the second waste chamber and third waste chamber dampers are closed. Accordingly, only white waste from the first waste chamber is carried by the combined air stream.

In the second operational mode, the first waste chamber and third waste chamber dampers are closed, while the second waste chamber damper is open. Thus, the combined air stream carries only thread waste.

In the third operational mode, the first waste chamber and the third waste chamber dampers are open, while the second waste chamber is closed. Thus, the combined air stream carries both white and knotter combined waste.

It should be understood by those of ordinary skill in the art, however, that various damper configurations may be desirable, depending upon, for example, a downstream filtering system or the waste fiber material types carried by the air streams. Furthermore, various suitable mechanisms and means may be employed to provide selective direct communication between the waste chambers and the combined air stream path. All such suitable arrangements are within the scope and spirit of the invention.

If a damper is closed such that direct pneumatic communication between a particular waste chamber and the combined air stream path is blocked, indirect communication between the waste chamber and the combined air stream path is provided. In this manner the air stream received by that waste chamber may be combined with the other air streams to form the combined air stream. The indirect path, however, includes a filter element to filter the waste fiber material carried by that air stream such that the waste fiber material is not conveyed to the combined air stream.

In one preferred embodiment, the indirect air stream path is provided via at least one other waste chamber wherein at least one filter element is positioned between the two chambers. Thus, for example, if the damper to the first waste chamber is closed while the damper to the second waste chamber is open, the air stream entering the first waste chamber is drawn through the filter element to the second waste chamber where it is combined with the second air stream received by the second waste chamber. The waste fiber material carried by the first air stream is collected in a matte on the filter separating the two waste chambers. Thus, the combined first and second air streams carry only the waste fiber material from the second air stream.

If the position of the first and second waste chamber dampers is reversed, such that the first waste chamber damper is open while the second waste chamber is closed, the first air stream is directly passed, along with the waste fiber material it carries, to the combined air stream. The second air stream, filtered by the filter between the first and second waste chambers, passes into the first waste chamber where it is combined with the first air stream. As it passes through the filter, the second air stream removes the matte from the filter, permitting that waste fiber material to pass through the first waste chamber damper to the combined air stream. Thus, the filter is self-cleaning in that switching from a first damper configuration to another causes an air flow shift that removes the fiber matte built during the first damper configuration.

Accordingly, by selectively positioning the first and second waste chamber dampers, the apparatus may combine the first and second air streams into a combined air stream while selectively permitting the combined air stream to convey one or both of the waste fiber materials carried by the air streams.

As noted above, one preferred embodiment of the present invention includes three waste chambers, each receiving an air stream carrying a particular waste fiber material. In particular, the apparatus operates in at least the three operational modes described above. As noted, white waste is carried by the combined air stream in the first operational mode. In this mode, white waste is carried directly from the first waste chamber through its damper to the combined air stream path. The second air stream carrying thread waste is drawn into the first waste chamber through a filter and is combined with the first air stream. The third air stream, carrying the knotter combined waste, enters the third waste chamber and is drawn to the first waste chamber through the second waste chamber. The third air stream is filtered by a filter as it enters the second waste chamber and is combined with the second air stream there.

In the second operational mode, the first air stream entering the first waste chamber is drawn to the second waste chamber and is filtered by the filter between the first and second waste chambers. The third air stream entering the third waste chamber is drawn to the second waste chamber and is filtered by a filter between the second and third waste chambers. The second air stream carrying the thread waste is received by the second waste chamber, is combined with the filtered first and second air streams, and is drawn through the open damper to the combined air stream path.

In the third operational mode, the second air stream received by the second waste chamber is drawn to the first waste chamber and is filtered by the filter between the first and second waste chambers. The first air stream received by the first waste chamber is combined with the filtered second air stream in the first waste chamber and is drawn through the open damper to the combined air stream path. The third air stream carrying the knotter combined waste is received into the third waste chamber and is drawn through its open damper to the combined air stream path where it is combined with the first and second air streams. In this way, the combined air stream conveys both knotter combined waste and white waste.

As noted, the combined air stream may selectively convey a desired combination of waste fiber materials, depending upon the configuration of the first filter device. The second filter device is configured to selectively separate these waste fiber material combinations from the combined air stream. For example, in the exemplary preferred embodiment described above, the second filter device includes at least three filter elements, each filter element configured to separate one corresponding waste fiber material combination.

The individual filter elements of the second filter device may be isolated by valves such that only one filter element filters the combined air stream at a given time. By controlling the operation of the valves, the combined air stream may be selectively directed to a particular filter element depending upon the operational mode of the first filter device, and, thus, the waste fiber material combination that is carried by the combined air stream. In this way, each filter element may filter one particular waste fiber material combination.

In this embodiment, a control device is configured to convert the first filter device among the operational modes and to control the second filter device to correspondingly separate the waste fiber material combinations resulting from each operational mode as described above.

In another preferred embodiment, the filtering system includes a third filter device configured to filter fine particulate matter not filtered by the first or second filter devices. The third filter device may be operably disposed downstream from the first and second filter devices and may comprise a drum filter.

Furthermore, the apparatus may include an auxiliary vacuum and filtering system for drawing and filtering the first, second and third air streams as a backup to the common vacuum system and second filter device. The auxiliary system includes a fan capable of drawing the first, second and third air streams from the textile machine. In one preferred embodiment, the filter elements between the waste chambers are used to filter the waste fiber materials from the air streams, if necessary, in place of the second filter device.

In further accordance with the objects of the invention, a method is provided for filtering waste fiber material from textile machines from three independent air streams without adversely interrupting operation of the textile machine. The method comprises the steps of drawing the first, second and third independent air streams from at least one textile machine such that each air stream conveys a type of waste fiber material from the textile machine. The waste fiber material types are selectively filtered from the air streams, which are combined, so that a desired at least one waste fiber material may be conveyed by the combined air stream. The waste fiber materials are separated from the combined air stream.

The accompanying drawings, which are incorporated in and constitute a part of the specification, illustrate one embodiment of the invention and, together with the description, serve to explain the principles of the invention.

DETAILED DESCRIPTION OF THE PREFERRED EMBODIMENT

Figure 1:
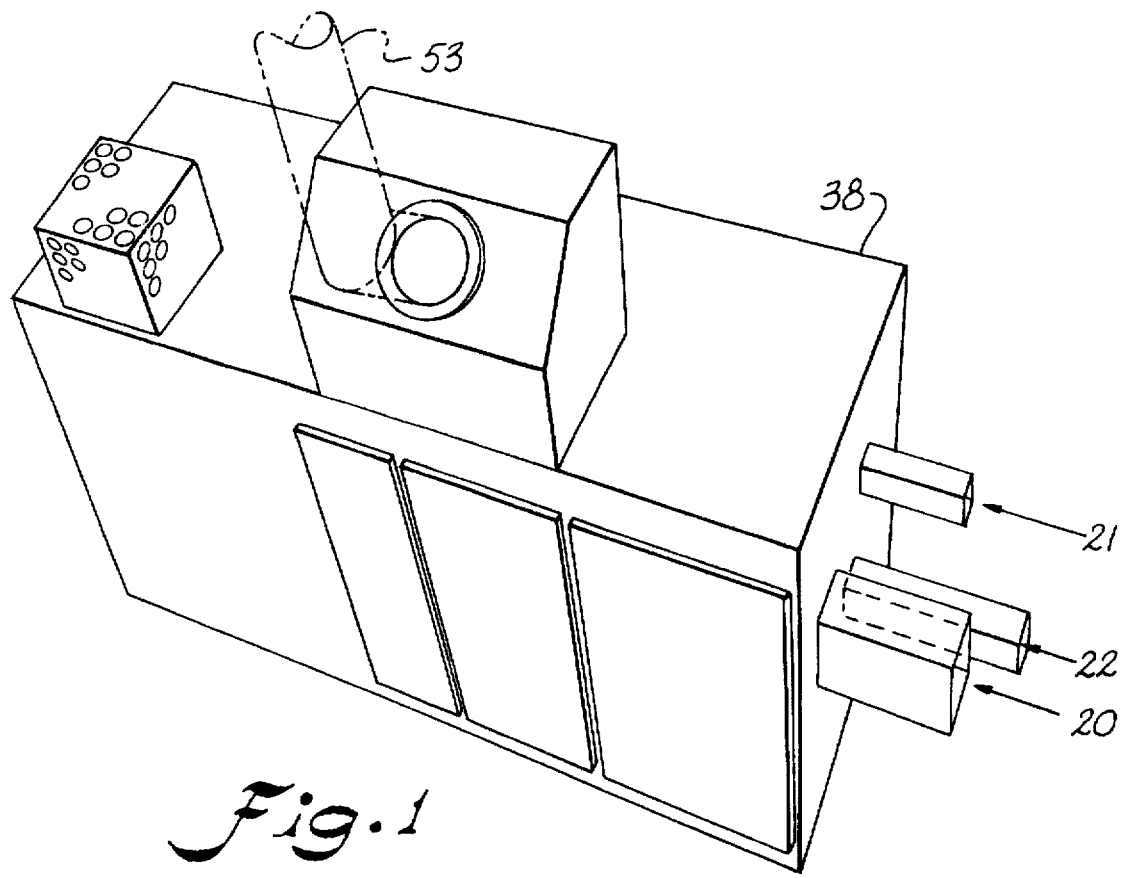
FIG. 1 is a perspective view of a portion of the air handling and filtering apparatus according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield still a further embodiment. Thus, it is intended that the present invention cover such modifications and variations as come within the scope of the appended claims and their equivalents. The numbering of components in the drawings is consistent throughout the application, with the same components having the same number in each of the drawings.

Figure 6:
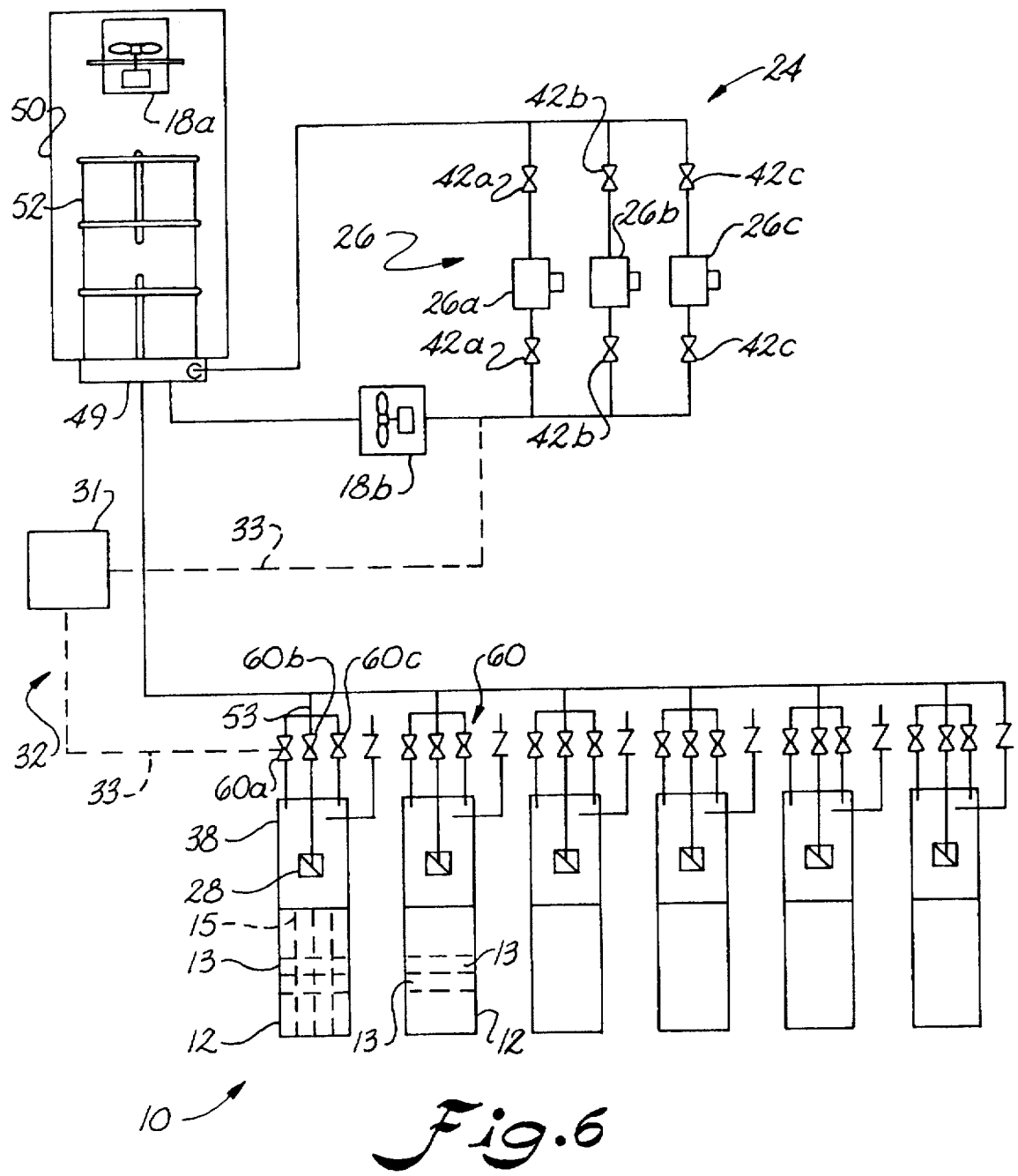
FIG. 6 is a diagrammatic representation of the air handling and filtering apparatus according to the invention shown in use with a plurality of textile machines.

In accordance with the present invention, and as illustrated in FIG. 6, an air handling apparatus 10 is provided for use with a plurality of textile machines 12. The textile machines are generally of the type having rows of spinning stations 13, such as an open-end spinning machine or a jet spinning machine. These textile machines are well known in the art and need not be described in detail herein.

Textile machines 12 are of the type that generally require the drawing and conveying of separate air streams therethrough. This can be accomplished, for example, by internal ducting 15 (dashed lines) running generally lengthwise along textile machines 12. A vacuum or negative pressure is drawn within duct 15 through three independent channels as shown generally in FIG. 1. Typically, each spinning station 13 is in pneumatic communication with the internal ducting 15. At least two of the ducts 15 are configured for conveying generally useful fiber material (white waste and thread waste) from the yarn formation area of each spinning station. It is essential to quality yarn formation that this fiber material be continuously conveyed away from the yarn formation area so as not to detrimentally affect yarn formation. Another of the ducts 15 is configured for conveying generally trash waste fiber material (knotter combined waste) away from each spinning station 13. This waste fiber material can be generated, for example, from piecing operations or cleaning of spinning components. An example of a textile machine for which the present air handling apparatus 10 can be configured is the Murata 802H.

Apparatus 10 according to the invention includes a common vacuum system. In the diagrammatic representation of FIG. 6, the common vacuum source comprises at least one fan 18a for drawing the first, second and third air streams 20, 21 and 22 (FIGS. 1 and 2) through the end housing units 38 of the textile machines 12. However, it should be understood that the common vacuum source may actually comprise a configuration of minifans, such as additional fan 18b, so long as the configuration of fans serves to produce a suction force common to the plurality of textile machines.

A filtering system, generally 24, is provided in pneumatic communication with the common vacuum system or fans 18a and 18b. In other words, fans 18 draw the air streams through the filtering system. Filtering system 24 comprises filtering devices for combining and commonly filtering first, second and third air streams 20, 21 and 22, as is explained in greater detail below.

Filtering system 24 includes a first filter device for selectively filtering the waste fiber material types from, and for combining, the air streams so that a desired at least one waste fiber material may be conveyed by a combined air stream to a second filter device configured to separate waste fiber material from the combined air stream. For example, referring to FIG. 6, the second filter device may comprise filter element 49 and filter 26. Filter 26 includes filter elements 26a, 26b and 26c. In this embodiment, filter 49 acts as a pre-filter to filter 26. Typically, conventional filtering devices are rated for a specific volume of air. If the system is configured with a great number of textile machines, the volume of air to be filtered may exceed the capacity of any single filtering device. In this event, a pre-filter may be utilized to reduce the filtering requirements of any downstream filter. Filter 49 may comprise, for example, a screen type filter which is capable of filtering out a significant portion of the useful waste material in the combined air stream while allowing fine particulate matter or dust to pass therethrough to, for example, a conventional drum type filter 52.

In the illustrated embodiment of FIG. 6, the combined air stream is drawn from the textile machines 12 through ducting 53 to filter 49 and then to filter 26 by means of fan 18a. Preferably, filter 26 filters the waste fiber material from the combined air streams 23 (FIGS. 3, 4 and 5) drawn from the plurality of textile machines 12. Each filter element 26a, 26b and 26c may comprise any manner of conventional filtering device, such as a fiber compactor or separator. The operation and applicability of these conventional filtering devices are well understood by those skilled in the art and need not be discussed in detail herein. Generally, any conventional fiber separator or filtering device which is useful in filtering waste fiber material may be used as a filter device 26. If the filter device has the capacity to directly filter the entire volume of air from the textile machines, a pre-filter 49 may not be needed.

As will be described in greater detail below, combined air stream 23 may carry various waste fiber material type combinations, depending upon the operational mode of the first filter devices housed in end housing units 38. For example, combined air stream 23 may carry white waste in a first operational mode, thread waste in a second operational mode, and a combination of white and knotter combined waste in a third operational mode. As discussed below, the operational mode of the first filter devices is controlled by control device 32. Three filters 26a, 26b and 26c are provided to individually filter a particular waste type combination carried by combined air stream 23. For example, filter element 26a may filter white waste from combined air stream 23 when the first filter devices are in the first operational mode. Similarly, filter element 26b may be used to filter thread waste while filter element 26c filters the white waste and knotter combined waste combination in the second and third operational modes, respectively.

In this embodiment, combined air stream 23 is filtered by only one filter element of filter 26 at a time, depending upon the operational mode of the first filter devices. Control device 32 controls valves 42 to isolate two filter elements of filter 26 so that combined air stream 23 is filtered by only one filter element. Thus, for example, during the first operational mode, valves 42b and 42c are closed while valves 42a are open, thereby permitting filter element 26a to filter combined air stream 23. Similarly, during the second and third operational modes, valves 42b and 42c, respectively, are opened while the other two valve pairs 42 are closed.

Preferably, valve pairs 42 may comprise conventional motorized or solenoid valves. It should be understood that any configuration of isolation devices or valves may be utilized to accomplish the objective of isolating particular filter elements of filter 26 and for directing the combined air stream to the desired filter element. It should also be understood that the parallel configuration of the filter elements and valves 42 may be altered, for example depending upon system parameters.

System 24 includes a first filter device 28 housed by end unit 38 for selectively filtering waste fiber material types from, and combining, the air streams so that a desired waste fiber material may be conveyed by combined air stream 23. As shown in FIG. 6, the first filter device comprises individual filters 28 which are housed in an end housing unit 38 adjacent to ends of the textile machines. It should be understood by those of ordinary skill in the art, however, that first filter device 28 may comprise a centralized filter for simultaneously combining all of the first, second and third air streams from the textile machines. Moreover, it should be understood that various suitable configurations of the first and second filters are within the scope and spirit of the present invention.

Figure 2:
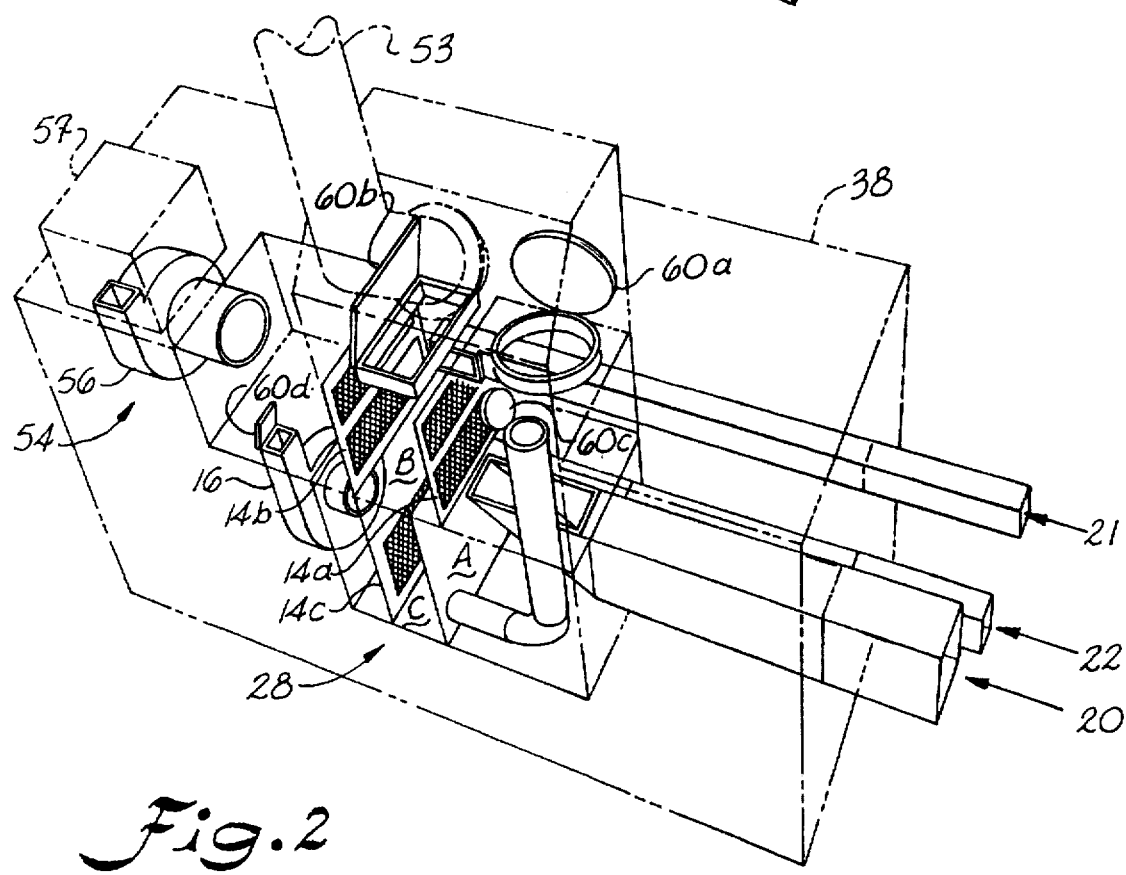
FIG. 2 is a partial interior view of the portion of the air handling and filtering apparatus as shown in FIG. 1.

Control device 32 is also configured to automatically shift the first filter devices 28 among the first, second and third operational modes. Referring to FIGS. 1 and 2, first filter device 28 is housed by end unit 38. The common vacuum source draws inner streams 20, 21 and 22 into and through first filter device 28 and draws the combined air stream through the combined air stream path defined by ducting 53. First filter device 28 includes a plurality of waste chambers. In particular, first waste chamber A receives first air stream 20; second waste chamber B receives second air stream 21; and third waste chamber C receives third air stream 22.

As described above, first filter device 28 operates, for example, in three operational modes. The operational modes are determined by the position of dampers 60. Those of ordinary skill in the art, however, should understand that dampers 60 are shown by way of example only and that various suitable means, for example valves, may be employed. Furthermore, the present invention is not limited to the particular arrangement of waste chambers or filter elements shown in FIGS. 2 through 5. It should be understood that various configurations and constructions of first filter device 28 are possible, depending, for example, on various operational constraints such as available space, air stream volume or waste fiber material types.

Dampers 60 maybe opened and closed by various suitable activating means such as mechanical arm or piston arrangements, mechanical ram devices, chain drives or geared systems which, for the sake of clarity, are not illustrated in the drawings. Such activating means should be understood by those of ordinary skill in the art and, thus, are not discussed in detail herein.

Figure 3:
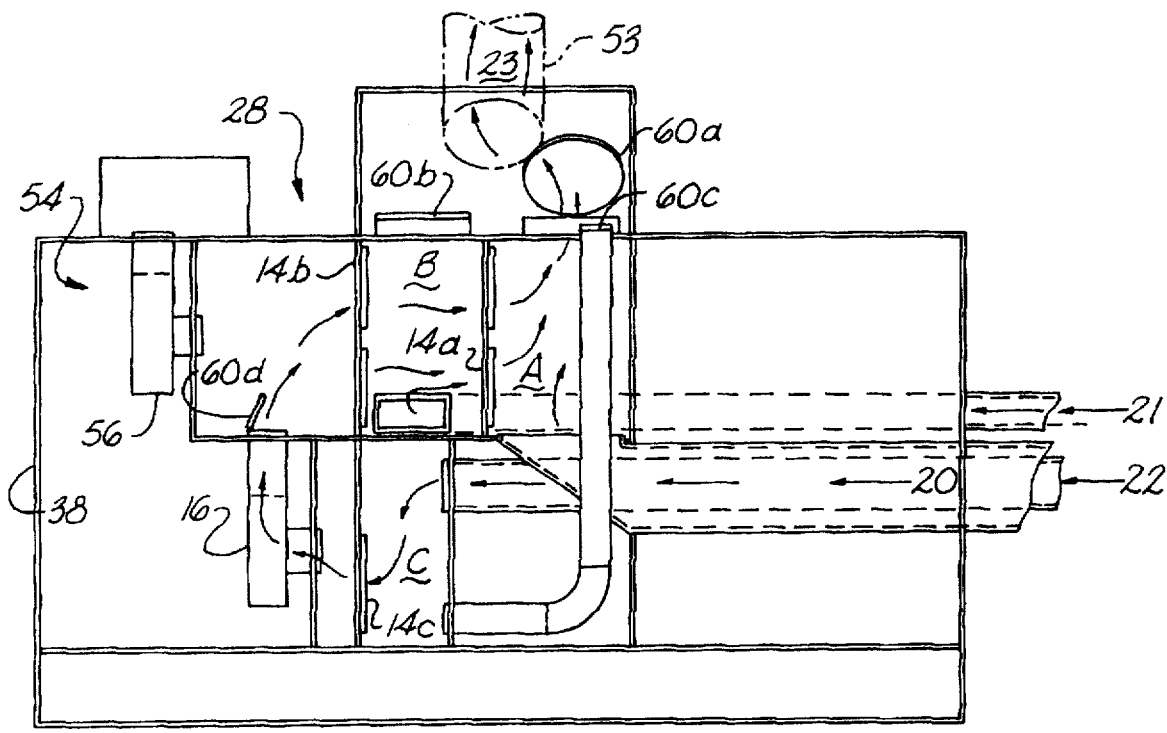
FIG. 3 is a schematic view of the portion of the air handling and filtering apparatus as shown in FIGS. 1 and 2 in a first operational mode.

First filter device 28 is illustrated in a first operational mode in FIG. 3. First air stream 20 carries white waste and is received into first waste chamber A. Damper 60a corresponding to first waste chamber A is open, subjecting first waste chamber A to the common vacuum source. Thus, the white waste carried by first air stream 20 is drawn through damper 60a to the combined air stream for filtering by the second filter device as described above. Second air stream 21 carries thread waste and is received by second waste chamber B. Corresponding damper 60b is closed, and second air stream 21 is drawn through filter element 14a, into first waste chamber A and through damper 60a to duct 53. The thread waste carried by second air stream 21 is collected in a matte on the waste chamber B side of filter element 14a. Third air stream 22 carries knotter combined waste and is received by third waste chamber C. Damper 60c is closed, and third air stream 22 is drawn through filter elements 14c and 14b, into second waste chamber B, through filter element 14a into first waste chamber A, and through damper 60a to duct 53. The knotter combined waste is collected on the waste chamber C side of filter element 14c. Due to the relatively long flow path of third air stream 22, booster fan 16 is employed.

Figure 4:
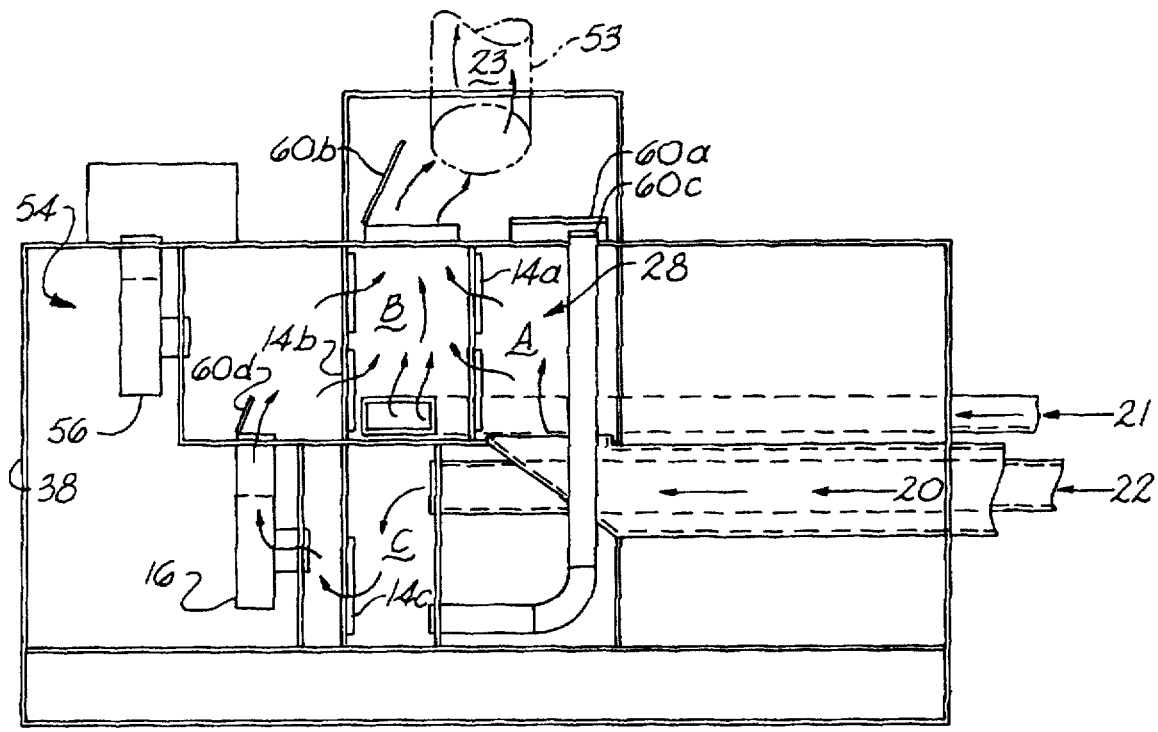
FIG. 4 is a schematic view of the portion of the air handling and filtering apparatus as shown in FIGS. 1 and 2 in a second operational mode.

A second operational mode is illustrated in FIG. 4. Damper 60a is closed. Thus, first air stream 20 is drawn by the common vacuum system through filter element 14a into second waste chamber B. If first filter device 28 is converted to the second operational mode from the first operational mode as shown in FIG. 3 and described above, first air stream 20 will knock the thread waste matte from the waste chamber B side of filter element 14a while a white waste matte collects on the waste chamber A side of filter element 14a. Second air stream 21 is drawn through second waste chamber B and damper 60b to duct 53 as shown, also tending to remove the fiber matte from filter element 14a. Thus, the thread waste carried by second air stream 21, along with the thread waste removed from filter element 14a by first air stream 20, is carried by combined air stream 23 to the second filter device. Third air stream 22 is again drawn by the common vacuum system and fan 16 through third waste chamber C, second waste chamber B, and damper 60b to duct 53. The knotter combined waste again collects on the waste chamber C side of filter element 14c.

Figure 5:
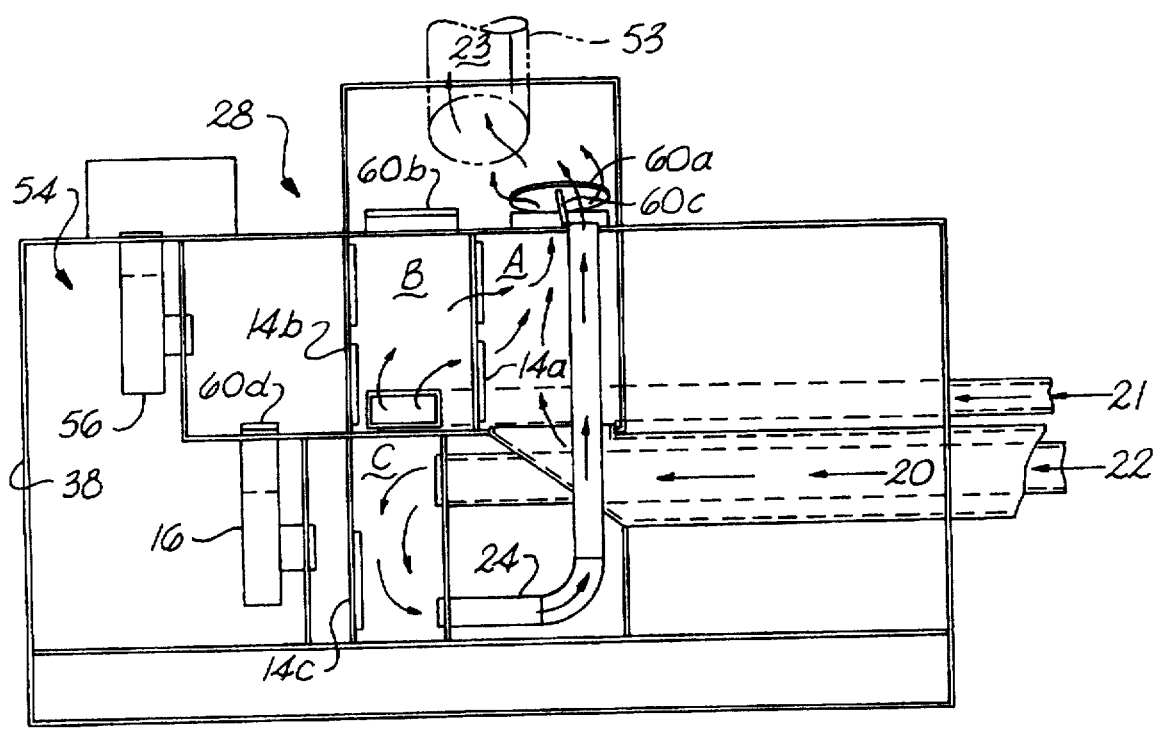
FIG. 5 is a schematic view of the portion of the air handling and filtering apparatus as shown in FIGS. 1 and 2 in a third operational mode.

A third operational mode is illustrated in FIG. 5. In this mode, damper 60a is open or partially open, damper 60b is closed, and damper 60c is open. Thus, first air stream 20 enters first waste chamber A and is drawn through damper 60a to duct 53. Second air stream 21 is drawn from second waste chamber B into first waste chamber A to duct 53 as described with respect to the first operational mode. If first filter device 28 is converted to the third operational mode from the second operational mode, the white waste matte on the waste chamber A side of filter element 14a is removed by second air stream 21 and by the circulation of first air stream 20. Again, a thread waste matte develops on the waste chamber B side of filter element 14a. Third air stream 22 is drawn to duct 53 from third waste chamber C through pipe 24 and open damper 60c. Any knotter combined waste matte on filter element 14c is removed by the circulation of third air stream 22.

Referring to FIGS. 2 through 5, damper 60d regulates air flow out of booster fan 16. In FIGS. 3 and 4, where damper 60c is closed and booster fan 16 aids the drawing of air stream 22, damper 60d is open. In FIG. 5, where damper 60c is open, air is not required, and damper 60d is closed. Moreover, booster fan 16 is stopped whenever damper 60c is opened.

As can be seen by the above discussion, the type of waste fiber material carried by combined air stream 23, and the point at which the three air streams are combined to form combined air stream 23, depends upon the operational mode of first filter device 28. In the first operational mode as shown in FIG. 3, combined air stream 23 carries only white waste. Second air stream 21 and third air stream 22 combine in second waste chamber B. These air streams combine with first air stream 20 in first waste chamber A. In the second operational mode as illustrated in FIG. 4, combined air stream 23 carries only thread waste, and all the air streams are combined in second waste chamber B. In the third operational mode as shown in FIG. 5, combined air stream 23 carries a combination of white waste and knotter combined waste. First air stream 20 and second air stream 21 are combined in first waste chamber A. These air streams combine with third air stream 22 after the air streams exit dampers 60a and 60c.

Referring again to FIG. 6, control device 32 controls the configuration of the dampers 60 to determine the operational mode of first filter 28 and accordingly controls the configuration of filter 26 so that combined air stream 23 is directed to the proper filter element of filter 26, depending upon the particular waste fiber material type combination that is carried. Furthermore, as noted above, third filter device 50 may preferably be provided to filter fine particulate matter that is not capable of being filtered from the combined air stream by any of the other filtering devices. Preferably, third filter device 20 comprises a conventional drum-type filtering system 52. a conventional known drum filter system for use with the present apparatus is the drum filter marketed by LTG Technologies, Inc., of Spartanburg, S.C. These drum-type filters are well understood by those skilled in the art. In the embodiment of FIG. 6, drum filter 52 is illustrated as being adjacent filter 49. In this embodiment, the combined air stream may be directed once again through filter 49 before passing into drum filter 52. However, it should be understood that this is a mere design consideration. Third filter 50 may be separately located with the filtered air stream being directed thereto.

Control device 32 preferably comprises a remote control station 31 and lines or connections 33 to the various valves, isolation devices, or dampers or other actuating means illustrated and described above. In this manner, a single operator can simultaneously convert the system from one operational mode to another. When an operational mode is completed, the particular filter element of filter 26 having just been utilized may be cleaned and/or serviced while the system continues to operate in another operational mode. As described above, the filter elements in first filter device 28 are essentially self cleaning as the system changes from one operational mode to the next. In this manner, filter system 24 may operate and be maintained for relatively long periods without interrupting the operation of textile machines 12.

In an alternative embodiment, control device 32 may include an automatic timing circuit for automatically shifting operational modes at predetermined time intervals. The control devices and systems utilized in such a configuration are well known in the art, and any such suitable system is within the scope of the invention.

As mentioned above, apparatus 10 may also include an auxiliary vacuum and filtering system 54, as illustrated in FIGS. 2 through 5. Auxiliary system 54 is provided to continuously draw and filter the three air streams in the event that the common vacuum source and filter 26 are isolated for servicing. Referring particularly to FIG. 1, dampers 60a, 60b and 60c would be closed in such a condition. Cover 57 would be replaced by a duct in communication with fan 56 via a damper (not shown). Fan 56 would be started upon the shutting of the dampers 60. Fan 56 has the capacity to draw the first, second and third air streams from the respective textile machine associated with its end housing structure 38. Fan 56 would draw first air stream 20 through first waste chamber A, second waste chamber B, and filter elements 14a and 14b. Second air stream 21 would be drawn through second waste chamber B and filter element 14b. Third air stream 22 would be drawn through third waste chamber C, third filter element 14c and booster fan 16. Fan 56 would then exhaust the combined air streams through the ducting to a separate containment device, such as a bag or filter. The auxiliary filter would aid in reducing the fine particulate airborne matter exhausted into the textile mill.

Thus, in the auxiliary configuration, all filtering functions are carried out by the first filter device 28. That is, first filter 28 separately filters the first, second and third air streams. If necessary, the auxiliary filter system 54 may be shut down so that the filters 14a, 14b and 14c may be cleaned and/or serviced. Under normal operation, however, the centralized filtering system 24 will be brought back online before such maintenance is required. At this time, auxiliary fan 56 will be secured and dampers 60 will be returned to one of the operational modes described above. The waste materials collected in the auxiliary configuration on the filter elements 14 would then be removed during the operational modes as indicated above.

It will be apparent to those skilled in the art that various modifications and variations can be made in the apparatus and method of the present invention without departing from the scope and spirit of the invention. For example, the arrangement of filters and fans may take a number of variations within the scope of the appended claims. Thus, it is intended that the present invention cover the modifications and variations of the invention provided that they come within the scope of the claims and their equivalents.

What is claimed:

1. An air handling apparatus for use with textile machines for filtering waste fiber material without adversely interrupting operation of the textile machine, said apparatus comprising:

a common vacuum system, said common vacuum system configured for drawing first, second, and third independent air streams from the textile machine, each of said independent air streams conveying a type of waste fiber material from the textile machine; and a filtering system in pneumatic communication with said common vacuum system to combine and commonly filter said first, second, and third air streams, said filtering system comprising:

a first filter assembly configured to selectively filter any combination of said waste fiber material types from said first, second, and third air streams and to combine said first, second, and third air streams so that a desired at least one of said waste fiber materials is conveyed by the combined air stream; and a second filter assembly downstream from said first filter assembly and configured to separate said at least one waste fiber material from the combined air stream.

2. The apparatus as in claim 1, wherein said first air stream conveys generally useful white waste from the textile machine, said second air stream conveys generally useful thread waste from the textile machine, and said third air stream conveys generally trash knotter combined waste from the textile machine.

3. The apparatus as in claim 1, wherein said apparatus is configurable with a plurality of spinning machines.

4. The apparatus as in claim 1, wherein said first filter assembly is configured to operate in at least a first, a second and a third operational mode and wherein in each said operational mode the combined air stream conveys a said desired at least one waste fiber material that is nonidentical to the said desired at least one waste fiber material conveyed in each other said operational mode.

5. The apparatus as in claim 4, wherein said first filter assembly includes a first waste chamber receiving said first air stream, a second waste chamber receiving said second air stream, and a third waste chamber receiving said third air stream, wherein each of said first, second and third waste chambers pneumatically communicates with a combined air stream path to selectively directly communicate with said combined air stream path so that said air stream received by said waste chamber conveys its corresponding waste fiber material to said combined air stream path.

6. The apparatus as in claim 5, wherein each said waste chamber directly communicates with said combined air stream path via a corresponding damper, each said damper being independently controllable to selectively permit air flow directly from its corresponding waste chamber to said combined air stream path.

7. The apparatus as in claim 5, wherein each said waste chamber pneumatically communicates with at least one other said waste chamber via at least one filter element such that when direct pneumatic communication from any said waste chamber to said combined air stream path is blocked, indirect pneumatic communication to said combined air stream path is provided via the at least one other said waste chamber if the direct pneumatic communication between said at least one other said waste chamber and said combined air stream path is open, wherein said at least one filter element is configured to prevent passage of the said waste fiber material carried by the air stream passing therethrough.

8. The apparatus as in claim 7, wherein in said first operational mode said first waste chamber directly communicates with said combined air stream path and wherein said second waste chamber and said third waste chamber indirectly communicate with said combined air stream path by said first waste chamber so that said first, second, and third air streams are combined in said first waste chamber.

9. The apparatus as in claim 7, wherein in said second operational mode said second waste chamber directly communicates with said combined air stream path and wherein said first waste chamber and said third waste chamber indirectly communicate with said combined air stream path by said second waste chamber so that said first, second, and third air streams are combined in said second waste chamber.

10. The apparatus as in claim 7, wherein in said third operational mode said first waste chamber and said third waste chamber directly communicate with said combined air stream path and wherein said second waste chamber indirectly communicates with said combined air stream path by said first waste chamber so that said first and second air streams are combined in said first waste chamber.

11. The apparatus as in claim 3, wherein said first filter assembly comprises an individual unit disposed in a housing structure generally adjacent the end of each textile machine, each said individual unit in pneumatic communication with said common vacuum system.

12. The apparatus as in claim 4, wherein said second filter assembly includes at least three filter elements, each said filter element configured to selectively separate a corresponding said waste fiber material combination from the combined air stream.

13. The apparatus as in claim 12, including a control device in operative association with said first filter assembly to convert said first filter assembly among said at least three operational modes and to control said second filter assembly to correspondingly separate the said waste fiber material combination resulting from each said operational mode.

14. The apparatus as in claim 13, wherein said control device includes remotely controlled valves configured to isolate individual said filter elements of said second filter assembly according to the operational mode of said first filter assembly.

15. The apparatus as in claim 1, wherein said filtering system includes a third filter assembly configured to filter fine particulate matter not filtered by said first or second filter assembly.

16. The apparatus as in claim 15, wherein said third filter assembly is disposed operably downstream from said first and second filter assemblies.

17. The apparatus as in claim 16, wherein said third filter assembly comprises a drum filter.

18. The apparatus as in claim 1, further comprising an auxiliary vacuum and filtering system for drawing and filtering said first, second, and third air streams, said auxiliary system acting as a back-up to said common vacuum system and said second filter assembly.

19. The apparatus as in claim 18, wherein said first filter assembly comprises an individual unit disposed in a housing structure generally adjacent the end of each textile machine, each said first filter assembly in pneumatic communication with said common vacuum system, wherein said auxiliary vacuum and filtering system comprises an individual auxiliary vacuum and filtering system disposed in each said housing structure, and wherein each said individual auxiliary vacuum and filtering system includes a fan capable of drawing said first, second, and third air streams from the textile machine.

20. The apparatus as in claim 19, wherein each said individual auxiliary vacuum and filtering system filters, in operative association with its associated individual unit of said first filter device, said first, second, and third air streams from the textile machine.

21. An air handling apparatus for use with textile machines for combining and selectively filtering air streams carrying waste fiber material from the textile machine, said apparatus comprising:

a common vacuum system, said common vacuum system configured for drawing first, second, and third independent air streams from the textile machine, said first air stream conveying generally useful white waste from the textile machine, said second air stream conveying generally useful thread waste from the textile machine, and said third air stream conveying generally trash knotter combined waste from the textile machine; and a filter assembly in pneumatic communication with at least one textile machine and in pneumatic communication with said common vacuum system via a combined air stream path, said filter assembly including a first waste chamber receiving said first air stream, a second waste chamber receiving said second air stream, and a third waste chamber receiving said third air stream, wherein each of said first, second and third waste chambers pneumatically communicates with said combined air stream path either directly, where the said air stream received into said waste chamber conveys its corresponding waste fiber material to said combined air stream path, or indirectly, where the waste fiber material is filtered from its corresponding said air stream received by said waste chamber before said air stream enters said combined air stream path, and wherein each of said first, second and third waste chambers are selectively configurable to either directly or indirectly communicate with said combined air stream path so that a desired at least one waste fiber material may be conveyed by the combined air stream.

22. The apparatus as in claim 21, wherein said filter assembly is configured to operate in at least three operational modes, wherein the combined air stream conveys a said desired at least one waste fiber material in each said operational mode that is nonidentical to the said desired at least one waste fiber material conveyed in each other said operational mode.

23. The apparatus as in claim 21, wherein said filter assembly comprises an individual unit disposed in a housing structure generally adjacent the end of each textile machine, each said individual unit in pneumatic communication with said common vacuum system.

24. The apparatus as in claim 21, including a second filter assembly configured to separate waste fiber material from the combined air stream.

25. An air handling apparatus for use with textile machines for filtering waste fiber material without adversely interrupting operation of the textile machine, said apparatus comprising:

a common vacuum system, said common vacuum system configured for drawing first, second, and third independent air streams from the textile machine, said first air stream conveying generally useful white waste from the textile machine, said second air stream conveying generally useful thread waste from the textile machine, and said third air stream conveying generally trash knotter combined waste from the textile machine;

a first filter assembly for combining and selectively filtering said first, second and third air streams, said first filter assembly being in pneumatic communication with at least one textile machine and in pneumatic communication with said common vacuum system via a combined air stream path, said first filter assembly including a first waste chamber receiving said first air stream, a second waste chamber receiving said second air stream, and a third waste chamber receiving said third air stream, wherein each of said first, second and third waste chambers pneumatically communicates with said combined air stream path either directly, where the said air stream received into said waste chamber conveys its corresponding waste fiber material to said combined air stream path, or indirectly, via at least one other said waste chamber via at least one filter element, such that when direct pneumatic communication from any said waste chamber to said combined air stream path is blocked, indirect pneumatic communication to said combined air stream path is provided via the at least one other said waste chamber if the direct pneumatic communication between said at least one other said waste chamber and said combined air stream path is open, wherein said at least one filter element is configured to prevent passage of the said waste fiber material carried by the air stream passing therethrough, wherein each of said first, second and third waste chambers are selectively configurable to either directly or indirectly communicate with said combined air stream path so that a desired at least one waste fiber material may be conveyed by the combined air stream;

a second filter assembly downstream from said first filter assembly and configured to separate waste fiber material from the combined air stream, said second filter assembly including at least three filter elements, each said filter element configured to selectively separate a corresponding said waste fiber material combination from the combined air stream; and a control device configured to convert said first filter assembly among at least three operational modes, each said operational mode defined by simultaneously configuring each of said first, second and third waste chambers to either directly or indirectly communicate with said combined air path, and to control said second filter assembly to correspondingly separate the said waste fiber material combination resulting from each said operational mode, wherein said control device includes remotely controlled valves configured to isolate individual said filter elements of said second filter assembly according to the operational mode of said first filter assembly.

26. An air handling apparatus for use with textile machines for filtering waste fiber material without adversely interrupting operation of the textile machine, said apparatus comprising:

a common vacuum system, said common vacuum system configured for drawing first, second, and third independent air streams from the textile machine, each of said independent air streams conveying a type of waste fiber material from the textile machine; and a filtering system in pneumatic communication with said common vacuum system to combine and commonly filter said first, second, and third air streams, said filtering system comprising:

a first filter assembly configured in a first operational mode to filter said waste fiber material from a first group of said first, second and third air streams so that said waste fiber material conveyed by the said first, second and third air streams not filtered in said first operational mode is conveyed by the combined air stream, and in a second operational mode to filter said waste fiber material from a second group of said first, second and third air streams so that waste fiber material conveyed by said first, second and third air streams not filtered in said second operational mode is conveyed by the combined air stream, wherein said first group and said second group are nonidentical groups of one or more of said air streams; and a second filter assembly downstream from said first filter assembly and configured to separate said waste fiber material conveyed by the combined air stream from the combined air stream.

* * * * *